March 22, 1966 J. M. ESSINK ETAL 3,241,526
POULTRY WATERING DEVICE
Filed Nov. 18, 1963
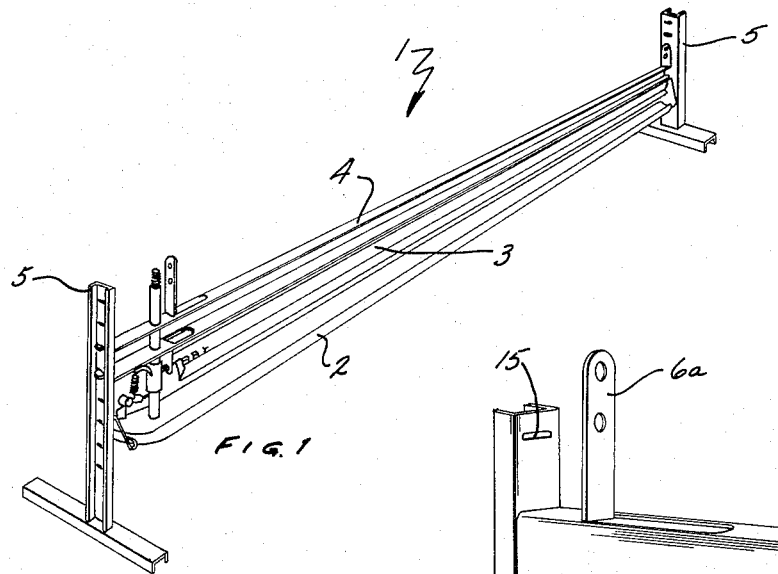
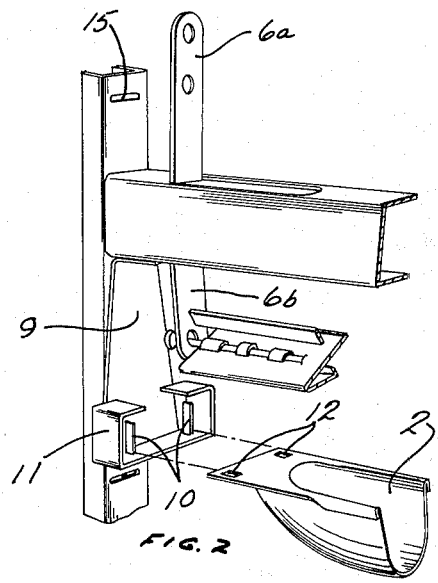
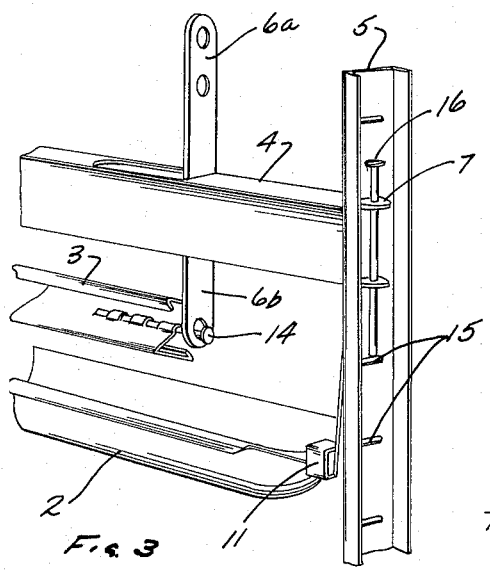
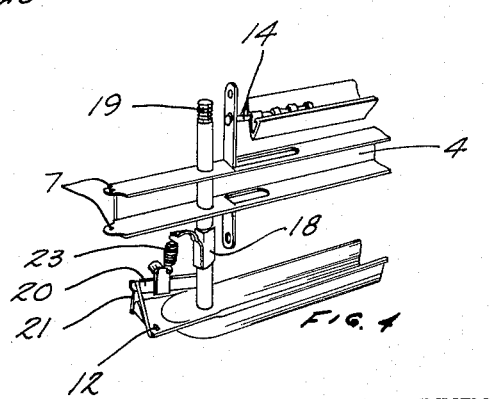
INVENTOR.
JEROME M. ESSINK
ROGERT L. VanHUIS
BY
Price & Heneveld

3,241,526
POULTRY WATERING DEVICE
Jerome M. Essink, Holland, and Robert L. Van Huis, Zeeland, Mich., assignors to Big Dutchman, Inc., a corporation of Michigan
Filed Nov. 18, 1963, Ser. No. 324,298
8 Claims. (Cl. 119—61)

This invention relates to a device for watering poultry, and more particularly to a standard and support construction for suspending a watering trough and its accessory hardware, which together provide for the automatic watering of poultry.

In the past a variety of devices have been developed for improving the ease and efficiency of watering poultry, but these various devices have failed to make available equipment which is both flexible and inexpensive and therefore feasible and practical for the smaller independent operator.

Throughout the development of previous watering devices the problem remained of devising such a device which could be easily and quickly assembled and installed, and yet could just as easily be disassembled and installed elsewhere. The prior devices also failed to solve the problem of the provision of a watering trough which could be easily removed, as for cleaning and the like, and yet would remain in its proper position in spite of the upsetting impacts imparted to it by the jostling movements of poultry.

The present invention has efficaciously solved these problems by making available to the smaller independent operator a flexible watering device which is inexpensive to manufacture, easy to assemble, install, disassemble and reinstall elsewhere. The device provides unique trough retention which cannot be dislodged by the poultry, yet is easily removed for cleaning.

Other objects and advantages of this invention include the provision of a freely rotatable anti-roost reel which prevents the poultry desired to be watered from roosting on or above the watering trough and thereby dirtying the equipment and fouling the drinking water contained in the trough. The anti-roost reel is readily adjustable vertically, so as to accommodate any desired size of poultry, from chicks to full-grown birds.

Additionally, the trough and anti-roost reel are suspended from a single longitudinal suspension member, and these components as a unit may then be simply mounted upon any convenient upright support members. In its preferred embodiments this composite unit is quickly and easily adjustable on the upright supports, so as to accommodate the needs of the individual user. Further, the device as a whole is simple to construct and maintain, has a low original cost and practically no maintenance expenses, and is a sturdy and enduring piece of equipment.

Clearly, other objects and advantages of this invention will become obvious upon perusal of the following specification in conjunction with the accompanying drawings, wherein:

FIG. 1 is a perspective view of a completely assembled poultry watering device.

FIG. 2 is an enlarged fragmentary perspective view of one end of the device of FIG. 1, extremities of the members having been cut away, showing in detail the provision of watering trough and anti-roost suspension mountings.

FIG. 3 is a fragmentary view, drawn in perspective, of the structure of FIG. 2, as seen from its end, showing in detail the manner of mounting the suspension member upon an upright support.

FIG. 4 is an alternative embodiment of the view of FIG. 2, showing the provision of valve means supporting one end of the trough, the upright support being removed.

Briefly, this invention concerns poultry watering equipment involving a watering trough supported pendantly from a suspension member connected between upright supports or standards. This improvement taught by this invention lies in the means of suspending the watering trough so that the trough may be easily removed when desired, and yet is not capable of being dislodged by the bumping impacts imparted to it by the movements of the poultry being watered. The scope of the invention is broadened by providing a poultry waterer utilizing this trough construction in conjunction with a freely rotatable anti-roost reel which is easily and readily vertically adjustable so as to prevent poultry of all sizes from roosting on or above the watering trough and thereby tending to dirty the equipment and foul the drinking water.

Referring now to the drawings, reference numeral 1 designates the complete poultry watering device, which includes a watering trough 2, an anti-roost reel 3, a longitudinal suspension member 4, and upright supports 5. As seen more clearly in FIG. 2, the suspension member 4 is preferably in the form of a U-shaped channel mounted with its sides in horizontal planes vertically disposed to each other. The longitudinal suspension member 4 is provided with vertical mounting straps 6a and 6b near each end of the member, formed from material cut from the sides of the member and bent so that the straps stand in substantially perpendicular relation to the member from which they were cut. The suspension member 4 also has its end extremities formed into mounting projections or ears 7 used in mounting the suspension member upon the upright supports 5, as hereinafter more fully described.

The watering trough 2 comprises an elongate concave structure of generally parabolic cross section, having concave side surfaces which prevent the birds from billing water out of the trough and thereby spilling it. The trough is formed so as to have substantially flat end extremities, wherein are formed mounting apertures 12.

Mounting brackets 9 are provided, the same being located near the ends of the suspension member, so that the brackets depend downwardly from this member. These mounting brackets are generally L-shaped pieces having their upper extremity adapted to allow them to be pendantly mounted upon the suspension member and having their lower portion formed so as to provide a substantially horizontal support surface, which then carries upstanding retainer pins 10 and shielding flanges 11, the latter serving to cover the retainer pins at their tops and one of their sides.

The watering trough 2 may be easily mounted upon the mounting bracket 9 by sliding the flat end portion of the trough into the space appearing between the tops of the retainer pins 10 and the shielding flanges 11. The mounting apertures 12 formed in the end portions of the trough may then settle over the retainer pins, and the weight of the trough will be supported by the flat horizontal bottom portion of the mounting bracket 9. With its mounting apertures properly seated over the retainer pins, the trough is secure, and is effectively prevented from being dislodged by any jarring movement against the trough from any direction.

The anti-roost reel 3 comprises generally an elongate Z-shaped member whose weight distribution falls at diagonally opposite points lying equidistant from the geometric axis or center of the member about which it is rotatably mounted. Thus this member is easily rotated about its mounting axis under the influence of the opposing moment arms resulting from the weight distribution and the anti-roost reel therefor presents not only a physical barrier to the poultry but a barrier which moves when contacted by a bird attempting to roost. This freely rotating movement so unsettles birds contacting the member that they are caused to move and to roost elsewhere. Simple and most effective means for mounting the anti-roost reel to the mounting straps 6a or 6b formed from the suspension member 4 is provided by any conventional shaft or pin means 14 carried by the anti-roost reel, which shaft or pin may simply be a conventional nail or spike. When the anti-roost reel is so mounted at each of its ends upon the mounting straps 6a or 6b by the shaft mounting means 14, the reel is free to rotate about the mounting shafts in the manner just described.

The water trough 2 and anti-roost reel 3 are thus carried pendantly by the longitudinal suspension member 4. This suspension member, as indicated previously, has its end extremities formed so as to present mounting projections or ears 7. In the preferred embodiment of this invention the upright support members 5 are provided, the same being equipped with flat wall portions having a series of horizontal slots 15 formed therein. These slots are spaced a distance equal to the spacing of the ear portions 7. In order to complete assembly of the poultry waterer, all that is necessary is to slide the formed end projections 7 of the longitudinal suspension member 4 through the slots 15 formed in the upright supports 5, and then secure this placement in any conventional manner, as by shaft or pin means 16. An easy and most efficient shaft or pin means 16 may be a simple nail or spike, commonly available on farms. Having once attached the longitudinal suspension member 4 to the upright supports 5 in the manner aforesaid, it is quite apparent that adjustments in height, or disassembly for reinstallation at another place may be easily accomplished as indeed is the original assembly and installation of the unit.

The basic structure which forms an operable poultry waterer preferably has incorporated into it a valve means 18, as shown in FIG. 4, to thereby produce a poultry watering device which automatically refills its watering trough in accordance with the demands by the poultry being watered. In this embodiment, the longitudinal suspension member 4 is provided near one of its ends with a vertical hole through which is inserted a water inlet pipe 19. After being so positioned, the water inlet pipe may be retained in place by any conventional means, such as a set screw threaded through the side of the suspension member 4 so as to bear against and thereby retain the inlet pipe 19.

In this configuration, the valve 18 is equipped with an actuating lever 20 adapted to engage and support a curved support bail 21. The curved support bail will now take the place of one of the mounting brackets 9 which previously served to suspend the water trough 2 from the suspension member 4 at this end, the opposite end of the trough continuing to be supported by a mounting bracket 9 in the manner discussed previously. The curved support bail 21 is formed so as to have upstanding end projections which will support the water trough 2 by engagement with its mounting apertures 12 in a manner similar to the retainer pins 10 of the mounting bracket 9. The actuating lever 20 of the valve 18, and hence the end of the water trough 2 supported therefrom, is urged upward by spring means 23. Thus, as the birds take water from the trough, the trough becomes lighter and will be moved upward by the urging of the spring 23 upon the actuating lever 20. When a predetermined minimum quantity of water remains in the trough, the trough and valve actuating lever will have been raised sufficiently so as to actuate the water valve 18, thereby producing a flow of water through the inlet pipe 19 into the trough 2, replenishing the supply of water therein. As the refilled trough moves downwardly due to its increased weight, the valve actuating lever 20 will follow the downward movement and will close the valve when the trough is refilled. In this manner a predetermined level of water will be constantly maintained within the trough.

*Assembly and operation*

Having described my invention, its assembly and operation should now be obvious. First, the projections or ears 7 of suspension member 4 are slid through a selected pair of slots 15 formed in the upright supports 5. This placement is retained by the insertion of suitable shaft or pin means 16 into apertures formed in the projections 7, thus rigidly supporting the suspension member 4 between the upright supports.

Next, the water trough 2 is mounted upon a mounting bracket 9 by sliding the flat end extremity of the trough bearing the mounting apertures 12 into the space appearing between the tops of the retainer pins 10 and the overhanging shielding flanges 11 until the mounting apertures are aligned with the retainer pins, permitting the pins 10 to enter into the apertures 12 and thereby permitting the trough 2 to rest upon the horizontal lower portion of the mounting bracket 9.

Having thus secured one end of the trough 2 in position, the other end adjacent the valve means 18 is then mounted on the valve actuating lever 20 by means of the curved support bail 21, as previously described. With the trough supported in the above manner, the valve means 18 will respond to decreased amounts of water in the trough by opening, so as to allow fresh water to enter the trough through the water inlet pipe 19, in the manner discussed previously, thereby enabling the watering device to automatically maintain a predetermined quantity of water in its trough.

The anti-roost reel 3 previously described is mounted horizontally by shaft or pin means 16 between two mounting straps 6a or 6b by merely inserting the end of the shaft or pin means into selected mounting apertures provided in the straps. The anti-roost reel may be mounted on straps extending either above or below the longitudinal suspension member and may readily be moved to other positions on the mounting straps, corresponding to the changing size of the birds as they mature, or to the size of different birds in different locations.

The method of trough retention and support disclosed herein renders the trough easily removable for normal cleaning operations, and of even greater importance, solves a problem of considerable vexation in the past since the mounted trough cannot be upset or dislodged from its resting place by the bumps and jolts imparted to it by the jostling movements of poultry in the area, which previously was the cause of spillage of water and resultant inoperation of the watering device.

Since in the preferred embodiment of this invention the anti-roost reel 3 and the watering trough 2 are carried by the longitudinal suspension member 4, the easy and flexible method of mounting and retaining the suspension member upon the upright supports 5, discussed above, makes available not only a unique, rigid support structure, but a rigidly supported watering device whose height may be quickly and simply raised or lowered so as to adjust the position of the watering trough and thereby accommodate various sizes of birds throughout their growth. Moreover, the device may be easily disassembled and moved elsewhere to suit the convenience of the grower, either operation being accomplished by simply removing the shaft or pin means 16 from the projecting ears 7 of the ends of the suspension member 4, withdrawing the projecting ears from the slots 15 in the wall portions of the upright supports 5, replacing the projecting ears in a newly-selected pair of slots, and re-inserting the shaft or pin means.

The simplicity and the utilitarian nature of the construction utilized in the present invention should be very evident, and although I have sought to illustrate preferred embodiments throughout this description, it is to be understood that many alterations and modifications will be apparent to those skilled in the art upon reading this disclosure which will not depart from the spirit of the invention, whose novel and inventive features are to be limited solely by the scope of the hereinafter appended claims:

We claim:

1. A watering device of the type having a watering trough suspended from first and second spaced supports by first and second attachment means; at least one of said attachment means for attaching the trough to the supports comprising a mounting bracket having at least one retainer pin upstanding therefrom, and shielding flanges attached to the bracket laterally adjacent such retainer pin so as to rise over and cover said pins at their tops and to shield them along at least one of their sides.

2. A watering device of the type having a watering trough suspended from a longitudinal suspension member; said suspension member being supported from first and second supports by first and second attachment means; at least one of said attachment means for attaching the trough to the longitudinal suspension member comprising a mounting bracket depending from the said suspension member, said mounting bracket having a substantially horizontal support surface, retainer pins upstanding from the said support surface, and shielding flanges attached to the bracket laterally adjacent the retainer pins, so as to rise over and cover the pins at their tops and shield them along at least one of their sides.

3. A watering device comprising: first and second spaced supports having flat wall portions; slots formed in the said flat wall portions of said supports; a longitudinal suspension member having each of its end portions formed to provide at least two vertically aligned ear portions slidably extendable through a pair of said slots; a single pin means for securing both ear portions on one end of said suspension member when extended through the slots; and trough means mounted on the longitudinal suspension member.

4. A watering device comprising: first and second spaced upright support members each having flat wall portions; a plurality of horizontal slots formed in each of said flat wall portions of said upright supports and spaced vertically one from the other; a longitudinal suspension member having its end portions formed with two spaced projecting vertically aligned ears adapted to slidably extend through and be received by a pair of the said slots; a single pin means for securing both of said ears on one end of said suspension member relative to said uprights when extended through said slots; and trough means mounted on the longitudinal suspension member.

5. A watering device comprising: first and second spaced support means; a longitudinal suspension member having vertical mounting straps sheared and formed from the member near each end thereof; means for releasably securing said suspension member to the said support means; an anti-roost reel comprising generally an elongate rotatable member; means for rotatably mounting the anti-roost reel upon the mounting straps sheared and formed from the longitudinal suspension member; trough means having mounting apertures formed at its end portions; and attachment means for securing the trough to the support means, said attachment means having upstanding retainer pins engageable with the mounting apertures formed at the ends of the trough means and having also shielding flanges serving to cover the said retainer pins from their tops and at least one of their sides, thereby permitting easy mounting of the trough upon the retainer pins while preventing its inadvertent dislodgement by the jostling movements of animals being watered.

6. A watering device comprising: first and second spaced upright support members, each having flat wall portions; equally spaced slots formed in the flat wall poritons of each of said upright support members; a longitudinal suspension member having its end portions formed into projecting ears which slidably extend through the said slots; means for securing the formed end projections of the suspension member when extended through the said slots; watering trough means having mounting apertures formed at its end portions; attachment means for releasably attaching the trough means to the suspension member, said attachment means having upstanding retainer pins to slidably engage the mounting apertures formed at the ends of the trough means, and shielding flanges serving to cover the said retainer pins from their tops and at least one of their sides, thereby permitting easy mounting of the trough means upon the retainer pins while preventing its inadvertent dislodgment by the jostling movements of animals being watered.

7. A watering device comprising: first and second upright support members, each having flat wall portions; equally spaced slots formed in the flat wall portions of each of said upright support members; a longitudinal suspension member having vertical mounting straps sheared and formed from the member near each end thereof; said member having each of its end portions formed into vertically aligned projecting ears which slidably extend through the above said slots; a single pin means for securing both formed end projections of the suspension member when extended through the said slots; watering trough means attachment means for releasably securing the trough means to the suspension member; an anti-roost reel comprising generally an elongate rotatable member; and means for rotatably mounting the anti-roost reel upon the mounting straps sheared and formed from the longitudinal suspension member near each of its ends.

8. A watering device comprising: first and second spaced upright support members, each having flat wall portions; equally spaced slots formed in the flat wall portions of each of said upright support members; a longitudinal suspension member having vertical mounting straps sheared and formed from the member near each end thereof and having the end portions of the member formed into projecting ears which slidably extend through the above said slots; means for securing the formed end projections of the suspension member when extended through the said slots; an anti-roost reel comprising generally an elongate rotatable member; means for rotatably mounting the anti-roast reel upon the mounting straps sheared and formed from the longitudinal suspension member; a watering trough having mounting apertures formed at its end portions; attachment means for releasably attaching the trough to the suspension member, said attachment means including at least one mounting bracket depending from the said suspension member and having upstanding retainer pins to slidably engage the mounting apertures formed at the ends of the trough, and having also shielding flanges attached to the bracket adjacent the retainer pins so as to cover the said retainer pins from their tops and at least one of their sides, thereby permitting easy mounting of the trough upon the retainer pins while preventing its inadvertent dislodgment by the jostling movements of animals being watered.

References Cited by the Examiner

UNITED STATES PATENTS

| | | | |
|---|---|---|---|
| 2,461,189 | 2/1949 | Thiel | 119—61 X |
| 2,524,711 | 10/1950 | Nelson | 248—264 |
| 2,703,098 | 3/1955 | Smallegan | 119—81 X |
| 3,000,350 | 9/1961 | Wilson | 119—81 |
| 3,145,007 | 8/1964 | Swinney | 248—149 |

FOREIGN PATENTS 21,891/29  8/1930  Australia.

SAMUEL KOREN, *Primary Examiner.*

HUGH R. CHAMBLEE, *Examiner.*